United States Patent [19]

Clamans

[11] 4,058,876
[45] Nov. 22, 1977

[54] SUPPORT ARRANGEMENTS FOR ROTARY SCRAPERS

[76] Inventor: Pedro Carlos Segismundo Clamans, P.O. Box 400, 1000 Buenos Aires, Argentina

[21] Appl. No.: 715,475

[22] Filed: Aug. 18, 1976

[30] Foreign Application Priority Data

Sept. 1, 1975 Argentina .................... 260212

[51] Int. Cl.² .............................................. B23D 71/00
[52] U.S. Cl. ........................................................... 29/78
[58] Field of Search ........................................ 29/78, 79

[56] References Cited

U.S. PATENT DOCUMENTS

| 2,058,229 | 10/1936 | Hodgkins | 29/78 |
| 2,079,995 | 5/1937 | Hodgkins | 29/78 |

Primary Examiner—Harrison L. Hinson
Attorney, Agent, or Firm—Ladas, Parry, Von Gehr, Goldsmith & Deschamps

[57] ABSTRACT

A rotary scraper comprises scraper rods, an annular support member formed with radial openings through which the scraper rods extend respectively, a position-maintaining member, and releasable clamping means for urging the position-maintaining member into contact with the support member. The position-maintaining member has non-slip surface portions against which the rods engage for securing the rods against radial movement with respect to the support member when the position-maintaining member is urged into contact with the support member. The rods are displaceable radially outwards with respect to the support member on release of the clamping means.

6 Claims, 10 Drawing Figures

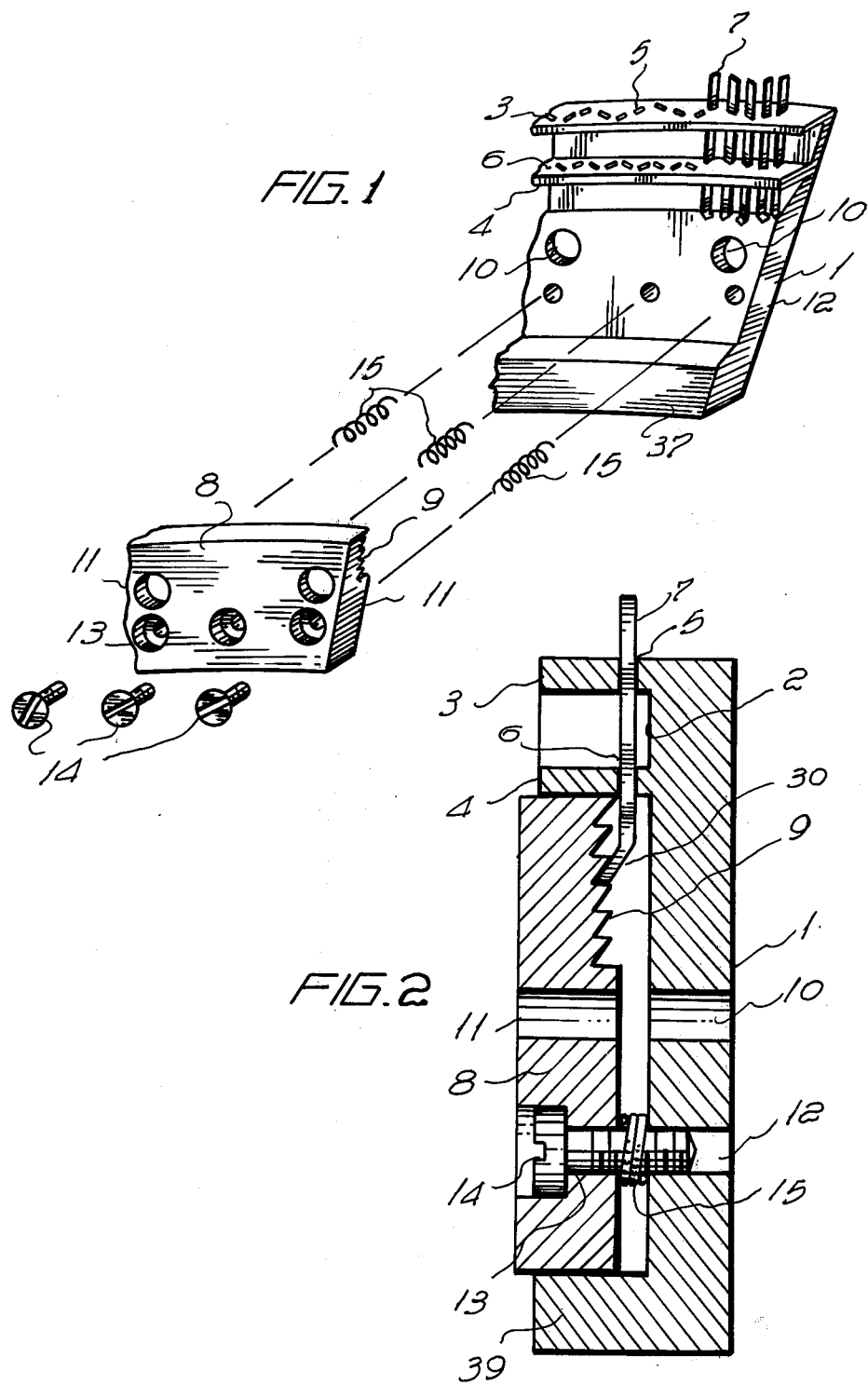

SUPPORT ARRANGEMENTS FOR ROTARY SCRAPERS

This invention relates to improvements in support arrangements for rotary scrapers and its main object is to provide a novel combination of means allowing to carry out in a simple way the assembly and gauging of the scraper, obtaining a correct alignment of the scraping members with the possibility of changing them when worn out.

The members of a scraper include active means constituted by rods having a body portion projecting outwards from the periphery of a holder, said rods being situated in corresponding housings formed between recesses arranged in the sides of juxtaposed discoid parts making up the holder, joined together by the axial pressure of pins or similar members acting on the same or indirectly keeping in position said active means.

The precision mounting of a series of rods is an operation which is neither simple nor practical and consequently in the past attempts were made to provide arrangements that would facilitate the transportation, storage and handling of the active assemblies used in the structure of rotary scrapers.

Thus there is a need of improved support arrangements easy to handle, permitting precise gauging without having to resort to complicated operations, and at the same time permitting to correct the gauging when natural wear modifies the shape of the active portion of the scraper.

In order to understand the invention and carry it out in a simple way, it is best to refer to the annexed drawings which show the preferred embodiment of the same. In these drawings:

FIG. 1 is a disassembled view showing in perspective one of the possible variants of the arrangement according to the invention;

FIG. 2 is a diametrical section of the embodiment of the invention illustrated in FIG. 1;

Figure 3:
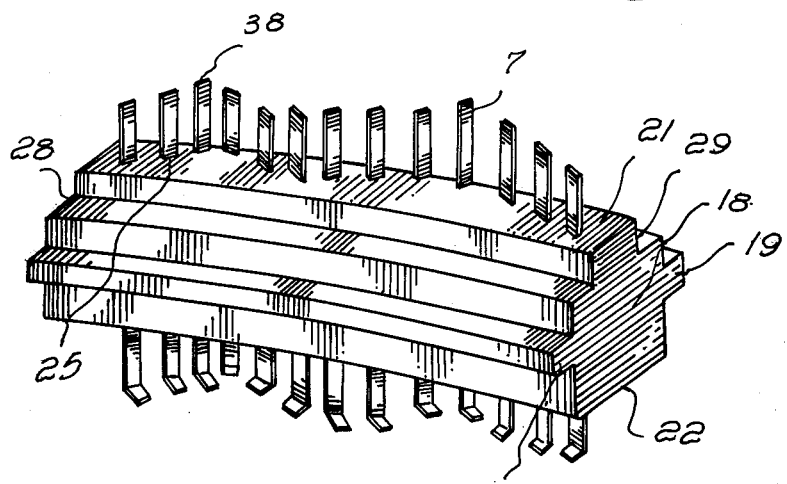
FIG. 3 is a perspective view of a modified embodiment of the invention.

In all of the figures the same references indicate like or corresponding parts of the arrangement according to the invention which comprises in one of its preferred embodiments a support 1 constituted by a flat member having an annular zone 2 which adjacent to its more developed edge is provided with a pair of cylindrical protrusions 3 and 4 having different diameters, as may be seen in FIG. 1. On the surface of the protrusions 3 and 4 open the bores 5 and 6, pairs of which correspond to common axes. This assembly forms the support of the rods 7 which constitute the active means of the scraper and are arranged as shown in FIG. 1, passing through each pair of corresponding bores 5, 6.

The support 1 has on its less developed edge a lateral cylindrical boss 39 which forms with the protrusion 4 a housing for a part 8 axially movable in the same.

Said part 8 has on part of its face facing the head an annular nonslipping zone 9, e.g. very rough, in contact with the inner ends of the rods 7.

Furthermore, in the housing formed in the head as well as in the part 8 is provided at least one bore 10, respectively 11, whose axis is substantially perpendicular to the bottom of the said housing; there is also provided at least one threaded bore 12 in the bottom of the housing and another one 13, coaxial to the same, in part 8.

Figure 4:
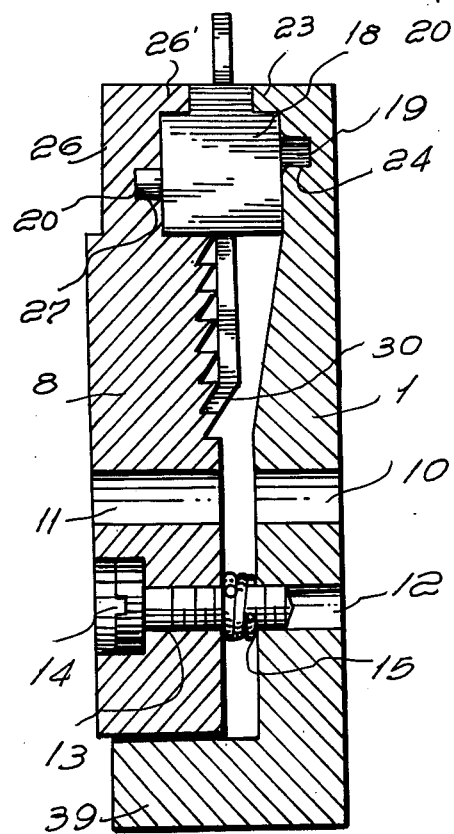
FIG. 4 is a diametrical section of the embodiment of the invention shown in FIG. 3.
Figure 5:
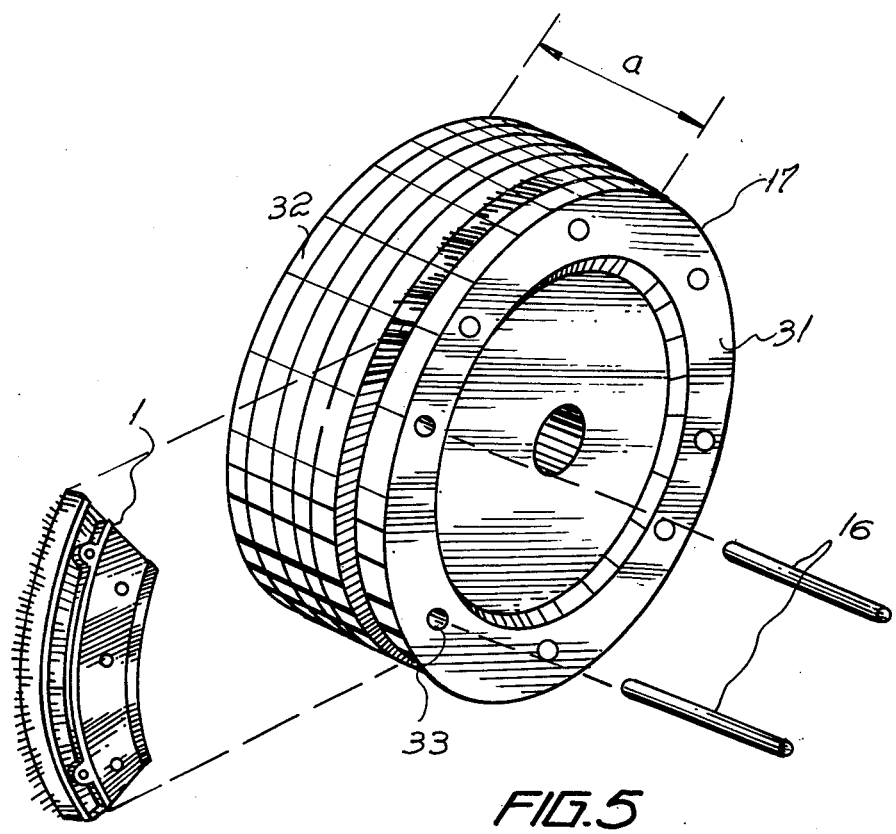
FIG. 5 is a perspective view of a rotary scraper assembled according to the arrangement contemplated by this invention.

Corresponding screws 14 pass through bore 13 and are screwed into bore 12, their body being surrounded by an expansion spring 15 interposed between the bottom of the housing and part 8, while through bores 10 and 11 may pass the alignment bars 16 which, as may be seen in FIG. 5, permit maintaining the correct position of the heads 1 during the assembly of the scraper 17. FIG. 3 shows a modified embodiment of the support 1 which in this case comprises a body in the shape of at least one annular sector substantially rectangular in section 18 whose side faces have each a rib 19, 20 occupying positions distinctly spaced from the upper 21 and the lower face 22 of the said body. In this case the support 1 has only one short lateral cylindrical boss 23 and a recess 24 to receive the rib 19 of the body 18, as may be seen in FIG. 4. A plurality of radial through bores 25 receives slidingly the rods 7. On the other hand, the part 8 has on its more developed edge a protrusion 26 provided with a short lateral boss 26' corresponding to the boss 23, and a groove 27. The short bosses 23 and 26' grip the body 18, engaging steps 28 and 29, and keep it in position by cooperating with the ribs 19 and 20 as may be seen in FIG. 4.

Neither the angular extension of the head 1 or the body 18 nor the shape of the latter or the arrangement of the bores 5, 6 or 25 and the number of bores 10 to 13 are essential for the invention; e.g. the head 1 or the body 18 may comprise an angular development of 2 or any lesser one without departing from the scope of this invention.

A rotary scraper utilizing the heads of this invention may be assembled as follows. The annular nonslipping zone 9 may bear with adjustable pressure against the ends 30 of the rods 7 the shape of which is complementary to that of the rough zone 9, e.g. such as shown in the figures, especially in FIG. 2 or 4, i.e. with a little catch or, as a variant, by incorporating in said end a rough facing which, when the adjusting pressure slackens, permits an outward movement of the rods under centrifugal force, and maintains them in position when the scraper assembly is stacked.

Figure 6:
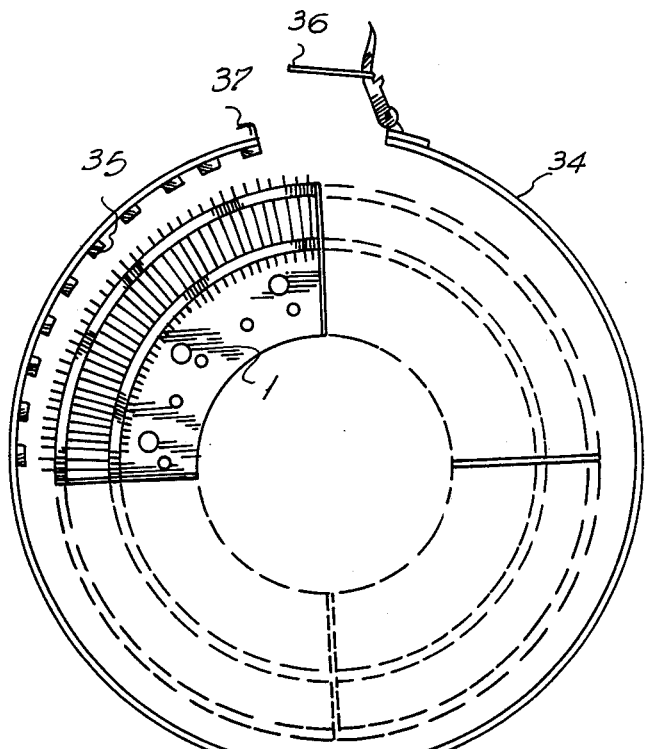
FIG. 6 shows how to place the clamp in order to position correctly the active means of the scraper.

Once the supports 1 have been prepared, placing the rods in positions approximately as shown in FIG. 6, the heads necessary to complete the width "a" of the scraper (see FIG. 5) are threaded on the alignment bars 16 which have previously been placed on the end plates 31 of the scraper 17, the disc being provided with holes 33 for such purpose.

Figure 7:
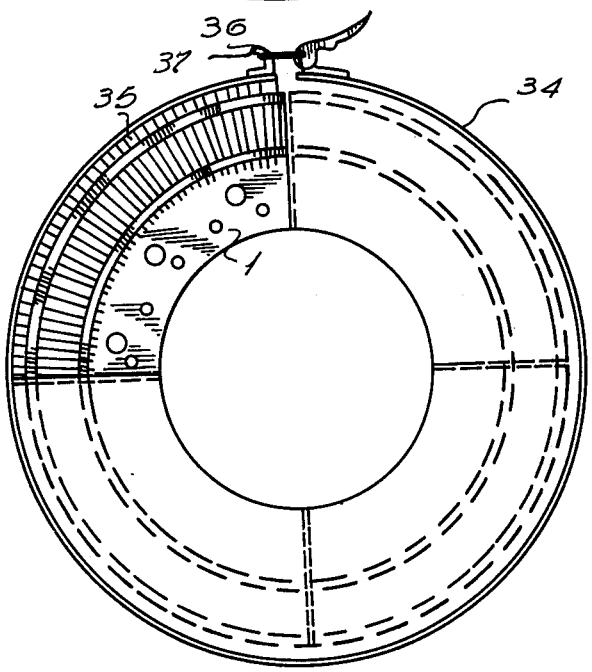
FIG. 7 is a view similar to that of FIG. 6, showing how the active members are positioned in order to be secured to the holder.

After completing the width "a" the other end plate 32 is threaded on said alignment bars and the assembly is surrounded with the clamp 34 which is provided with stops 35 bearing against the outer surface of said assembly, so that when the said clamp is closed by means of the ring and hook closure 36 and 37 the space between the inner surface of the clamp and the outer surface of the assembly determines exactly the projection of the rods, as may be seen in FIGS. 6 and 7.

After carrying out the above mentioned operations the position obtained for the rods is definitively fixed by tightening the central bolt with which the shaft of the scraper is provided, thus providing the axial compression necessary for the complementary characteristics of the surfaces 9 and 30 to bring about an engagement having sufficient friction to compensate for the centrifugal force acting on the rods when the scraper rotates.

Inverse operations permit to reduce the axial pressure, and by placing the clamp again in position and applying centrifugal force it is possible to position those rods that are worn and whose ends are thus beneath the correct surface corresponding to the clamp.

In the case of the embodiment shown in FIG. 3 and so that the rods may not slide beyond the necessary distance, in order not to separate from the body 18, it is also possible to provide the end 38 of the same with a drop of wax or like material, thus forming a transitory enlargement which does not allow them to slip out of the bores 25.

Figure 8:
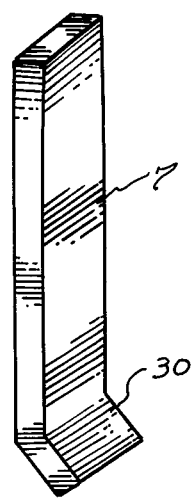
FIG. 8 is a perspective view of one of the possible embodiments of an active member of the scraper.
Figure 9:
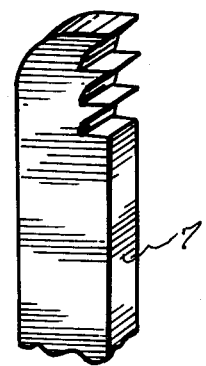
FIG. 9 is a perspective view of another possible embodiment of an active member of the scraper.
Figure 10:
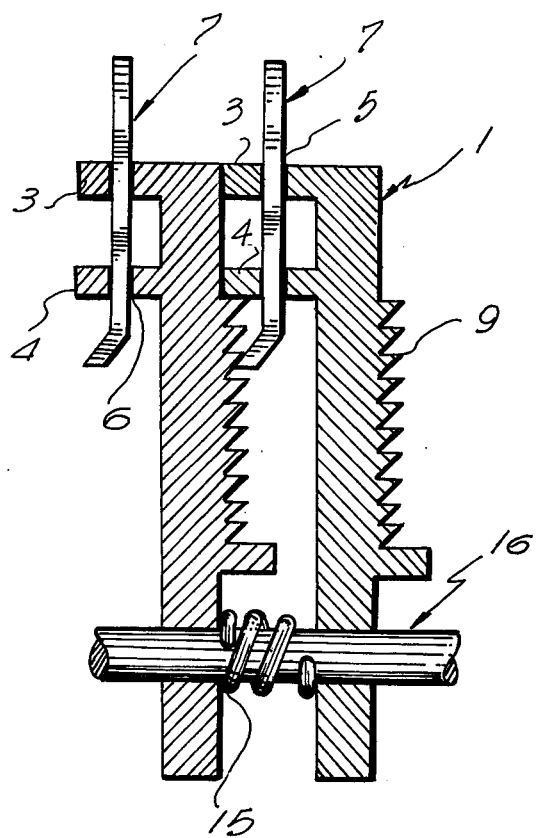
FIG. 10 is a drametrical sectional view of another embodiment of the invention.

FIGS. 8 and 9 show possible shapes of the rods 7, adapted to the work they might have to do. As shown, the end may by sawtooth shaped, FIG. 9 or smooth, FIG. 8. This is not a matter of significance to the invention. Referring now to FIG. 10, this shows a modified embodiment of the invention in which the nonslipping zone 9 is formed on the support 1 itself, on the face opposite the protrusions 3 and 4. In this way several supports 1 may be coupled to each other (only two are shown in FIG. 10), thus obtaining multiple rows of scraping rods.

Having thus particularly described and ascertained the nature of the present invention and the say to carry it out, what I claim is:

1. A rotary scraper, comprising a plurality of scraper rods, an annular support member formed with a plurality of radial openings through which the scraper rods extend respectively, a position-maintaining member, and releasable clamping means for urging the position-maintaining member into contact with the support member, one of said members having non-slip surface portions against which said rods engage for securing the rods against radial movement with respect to the support member when the position-maintaining member is urged into contact with the support member, and the rods being displaceable radially outwards with respect to the support member on release of the clamping means.

2. A rotary scraper as claimed in claim 1, wherein the support member includes two coaxial annular projections of different size, so that one of the projections is surrounded by the other projection, each projection is formed with a plurality of radial openings, each scraper rod extends through one of said openings in said one projection and through one of said openings in said other projection, and said non-slip surface portions are positioned radial inwards of said one projection.

3. A rotary scraper as claimed in claim 1, wherein the support member is formed from a plurality of sectors, of substantially rectangular radial section, and said position maintaining member is in the form of a disc provided with said non-slip surface portions, the sectors and the position-maintaining member being formed with guide means for maintaining them in their correct relative positions.

4. A rotary scraper as claimed in claim 1, wherein said non-slip surface portions are provided on said position-maintaining member.

5. A rotary scraper, comprising a plurality of scraper rods, annular support means formed with a plurality of radial openings through which the scraper rods extend respectively, a position-maintaining member, and releasable clamping means for urging the position-maintaining member into contact with the support means, said position-maintaining member having non-slip surface portions against which said rods engage for securing the rods against radial movement with respect to the support means when the position-maintaining member is urged into contact with the support means, and the rods being displaceable radially outwards with respect to the support means on release of the clamping means.

6. A rotary scraper as claimed in claim 4, wherein said annular support means are formed from a plurality of sectorial members of substantially rectangular radial section.

* * * * *